H. M. CONNOR & D. D. MILES.
AUTOMATIC VALVE FOR FUEL FEED SYSTEMS.
APPLICATION FILED JULY 23, 1917.

1,284,877.

Patented Nov. 12, 1918.

Inventors
Herschel M. Connor and
Don D. Miles, by
T. A. Witherspoon
Attorney

UNITED STATES PATENT OFFICE.

HERSCHEL M. CONNOR AND DON D. MILES, OF SAN FRANCISCO, CALIFORNIA, ASSIGNORS TO W. B. RUCKER, OF SAN FRANCISCO, CALIFORNIA.

AUTOMATIC VALVE FOR FUEL-FEED SYSTEMS.

1,284,877.

Specification of Letters Patent.

Patented Nov. 12, 1918.

Application filed July 23, 1917. Serial No. 182,341.

*To all whom it may concern:*

Be it known that we, HERSCHEL M. CONNOR and DON D. MILES, both citizens of the United States, residing at San Francisco, in the county of San Francisco and State of California, have invented certain new and useful Improvements in Automatic Valves for Fuel-Feed Systems; and they do hereby declare the following to be a full, clear, and exact description of the invention, such as will enable others skilled in the art to which it appertains to make and use the same.

This invention relates to fuel feed systems for internal combustion engines and more especially to thermally actuated valves for controlling the same, and has for its object to provide a device of this character which will be simple in construction, comparatively inexpensive to maufacture, and more efficient in action than those heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1:
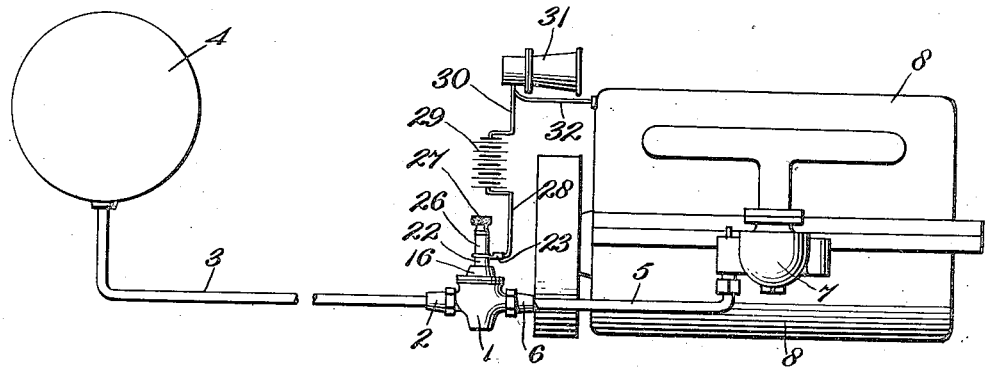
Figure 1 is a diagrammatic side elevational view of a valve made in accordance with this invention, applied to the fuel supply pipe of an automobile or motor boat engine.
Figure 2:
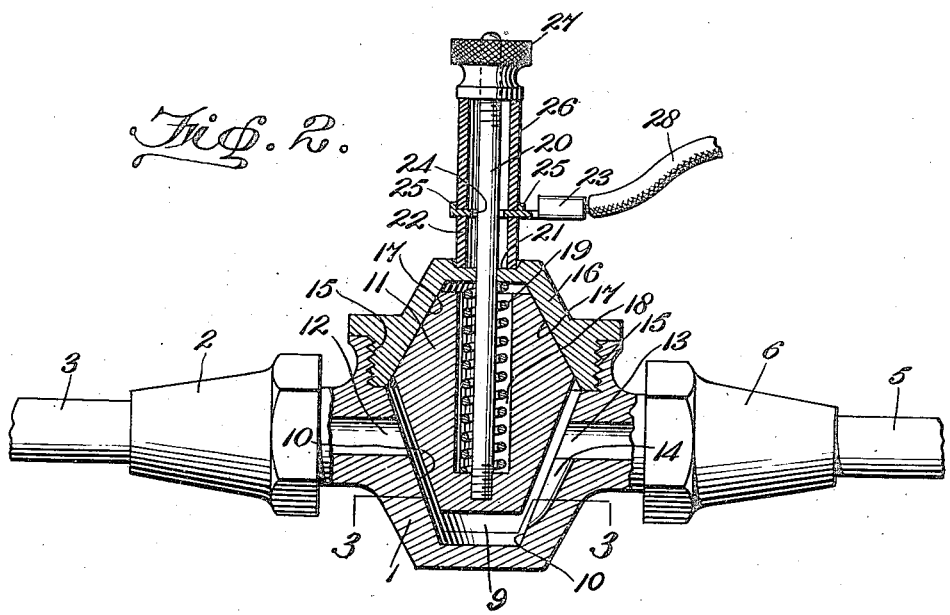
Fig. 2 is a central vertical sectional view, on an enlarged scale, of the valve shown in Fig. 1.
Figure 3:
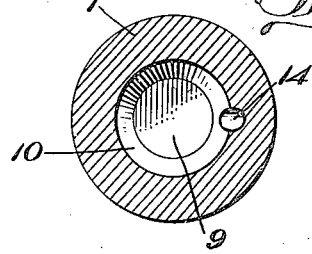
Fig. 3 is a horizontal sectional view, taken on the line 3—3 of Fig. 2 and looking down.

1 indicates a casing or body to one side of which is connected, as by the union or coupling 2, the pipe 3, leading from the fuel supply tank 4. A pipe 5 is connected as by the coupling 6 to the opposite side of the casing 1, and leads to a carbureter 7, associated with the motor 8. The casing 1 is provided with a bore or chamber 9 ground to form one seat 10 for the double truncated-cone-shaped valve plug 11, see Fig. 2. The casing 1 is further provided with a passage or port 12 leading from the pipe 3 to the bore 9, and also with a passage or port 13, leading from said bore 9 to the pipe 5. 14 designates a channel or by-pass leading from the lower portion of the bore 9 to the said passage 13, for a purpose to be more fully disclosed below.

The said casing 1 is screw threaded as at 15 to accommodate the cap or nut 16, provided with another seat 17 adapted to coact with the plug 11. The said plug 11 is recessed as at 18 to receive a spring 19 which surrounds a rod or stem 20, secured to the lower end of the said plug. 21 indicates a circular depression in the cap 16 into which fits a sleeve or tube 22, of celluloid, hard rubber, or other inflammable insulating material.

Resting on the said sleeve 22 is a metal terminal 23, provided with an opening 24 of sufficient size to permit the rod 20 to pass therethrough without contacting at any point with the said terminal 23. The terminal 23 is also provided with an annular rib 25 forming a socket into which fits a second inflammable sleeve 26, as shown. A nut 27 is screw threaded on the upper end of the stem 20 and takes against the said sleeve 26.

The terminal 23 is connected as by the wire 28 to one pole of a suitable battery 29, the other pole of which is joined as by the wire 30 to one terminal of a horn or other signal 31. The other terminal of the said signal may be grounded to the engine 8 as by the wire 32.

The operation of the device will be clear from the foregoing but may be briefly summarized as follows:—

The casing 1, with the plug 11, spring 19, stem 20, and cap 16 in place, is connected in the line of the fuel supply, preferably near the carbureter 7. The spring 19 will now force the plug 11 down on the seat 10, thus cutting off communication between the ports 12 and 13. A sleeve such as 22 is now fittted in place in the depression 21, the terminal 23 is slipped over the stem 20, (the nut 27 being remcved), and a sleeve such as 26 is fitted within the annular rib 25. The nut 27 is now screwed down on the stem 20 forcing the plug 11 upward against the compression of the spring 19, and opening communication between the ports 12 and 13. Continued turning of the nut 27 will cause the plug 11 to seat on the conical surface 17 and thus prevent fuel from leaking out into the sleeve 22 around the stem 20. In case of fire near the valve or if for any other reason an excessive or dangerous amount of heat is generated in close proximity thereto, the sleeves 22 and 26 will ignite and be consumed, whereupon the spring 19 will force the plug 11 down on the seat 10 and stop the flow of fuel to the carbureter. Any oil which is trapped beneath the descending plug will be forced out through the by-pass 14, thus permitting the valve plug 11 to seat perfectly.

As the inflammable sleeves 22 and 26 burn, the terminal 23 will fall into contact with the cap 16 or with the stem 20, completing the electric circuit through the signal 31, and sounding the alarm.

It will thus be seen that, owing to the above described construction, the present device performs two distinct functions; first, as a valve for controlling the flow of fuel from the gasolene tank to the engine which automatically cuts off said flow in case of fire; and second, as an automatic circuit maker which closes an electric circuit and sounds an alarm when such flow is cut off. Owing to the construction of the cap 16 and of the terminal or contact member 23, and the employement of the celluloid, rubber, or other inflammable, insulating sleeves 22 and 26, the said member 23 is normally positively held out of contact with its companion member or stem, 20, and the electric circuit thereby kept open. It will be readily apparent that the tubes or sleeves 22 and 26 must not only be inflammable, but must also be of an electrical insulating material, since the employment of a fusible metal alloy sleeve would close the electric circuit and sound the horn or other signal continuously. Just as soon, however, as the said sleeves are ignited and consumed the said member 23 is released and engages either the stem 20 or the cap 16, thus closing the circuit and sounding the alarm. At the same time the spring 19 is released and forces the valve plug 11 down onto its lower seat 10, cutting off the flow of fuel and thereby diminishing the risk of explosion.

Further, owing to the ground surface 17 of the cap 16, the plug 11 makes a good joint therewith to prevent leakage into the sleeves 22 and 26 and consequent short circuiting of the signal circuit due to water in the gasolene, as well as to prevent the destruction of the said sleeves when they are made of rubber, due to the solvent action of the gasolene. And owing to the screw threads on the stem 20 and nut 27, this said joint may be tightened from time to time should it for any reason become loose. It is very desirable, therefore, during such tightening operation, that the nut 27 engage fresh threads on the stem 20, since the said threads are subject to more or less wear. This is accomplished by making the said sleeves of rubber or other equivalent insulating as well as readily yielding material, which yielding quality enables fresh and strong threads to be engaged by the nut as it is screwed down on the stem 20.

It thus results that the yielding and insulating character of the said sleeves 22 and 26 performs the double function of enabling a tight joint to be always secured between the plug 11 and its seat 17, as well as the maintenance of an open circuit in the signaling system.

It is obvious that those skilled in the art may vary the details of the construction as well as the arrangement of parts without departing from the spirit of the invention, and therefore, we do not wish to be limited to the above disclosure except as may be required by the claims.

What we claim is:—

1. In an automatic valve for fuel feed pipes the combination of a casing provided with a tapered chamber closed at one end constituting a valve seat, a pair of ports communicating with said chamber, and a by-pass leading from one of said ports to the closed end of said chamber; a cap provided with a depression and with a second tapered valve seat detachably secured to said casing; a double cone-shaped plug provided with a recess mounted within said casing and adapted to coact with either of said valve seats; a stem rigid with said plug passing through said cap and through the recess of said plug, constituting one contact member of an electric signal circuit; a spring mounted within the recess of said plug and surrounding said stem and bearing against the cap, an inflammable insulating sleeve also surrounding said stem; and seating in said cap depression; a second contact member associated with said sleeve and normally held out of engagement with said first named contact; and a nut adapted to coact with said sleeve and stem to normally maintain said plug in contact with one of said valve seats against the action of said spring, substantially as described.

2. In an automatic valve for fuel feed pipes the combination of a casing provided with a tapered chamber closed at one end constituting a valve seat, a pair of ports communicating with said chamber, and a by-pass leading from one of said ports to the closed end of said chamber; a cap provided with a depression and with a second tapered valve seat, detachably secured to said casing; a double cone-shaped plug provided with a recess mounted within said casing and adapted to coact with either of said valve seats and to force fuel through said by-pass when the valve is seated in the first-named seat; a stem rigid with said plug passing through said cap and through the recess of said plug, constituting one contact member of an electric signal circuit; a spring mounted within the recess of said plug and surrounding said stem and bearing against the cap; a second contact member provided with an annular rib associated with said first member; an inflammable insulating sleeve seated in said cap depression, supporting said second contact member; a second inflammable insulating sleeve seated within said annular rib of said second contact member; and a nut associated with said stem coacting with said sleeves to normally maintain said plug in contact with one of said valve seats against the action of the spring, substantially as described.

In testimony whereof we affix our signatures, in presence of two witnesses.

HERSCHEL M. CONNOR.
DON D. MILES.

Witnesses:
H. A. DOYLE,
MARY L. THOMAS.